United States Patent
Barton

[15] 3,649,034
[45] Mar. 14, 1972

[54] MODULAR INTERWALL SEAL UNIT

[72] Inventor: Bruce G. Barton, Livonia, Mich.

[73] Assignee: Thunderline Corporation, Wayne, Mich.

[22] Filed: Sept. 15, 1970

[21] Appl. No.: 72,440

[52] U.S. Cl. ..............................277/104, 277/124, 277/192, 277/199, 285/346
[51] Int. Cl. .........................................................F16j 15/10
[58] Field of Search ..................277/102, 104, 108, 123, 124, 277/192, 199, 223, 224; 285/346

[56] References Cited

UNITED STATES PATENTS

| | | | |
|---|---|---|---|
| 750,534 | 1/1904 | George | 277/199 X |
| 2,266,742 | 12/1941 | Crawford | 277/192 |
| 2,558,050 | 6/1951 | Maelen | 277/166 |
| 2,720,267 | 10/1955 | Brown | 277/123 X |

Primary Examiner—Robert G. Nilson
Attorney—Kinzer, Dorn and Zickert

[57] ABSTRACT

An annular shock-absorbing seal assembly, formed from a plurality of interconnected modular seal units; each modular seal unit includes a resilient elastomer seal block and two pressure plates, joined by a bolt that extends through the block, one plate being mounted on each face of the seal block. The seal assembly is initially held together by releasable connector means, independent of the pressure plates and bolts, which may comprise separate connector pins, interfitting lugs and sockets on the seal blocks, or a continuous wire or rope. The assembly can be lengthened to fit a variety of different size conduits by adding additional modular units.

14 Claims, 11 Drawing Figures

Patented March 14, 1972

Inventor
Bruce G. Barton
By Kinzer, Dorn and Zickert
Attorneys

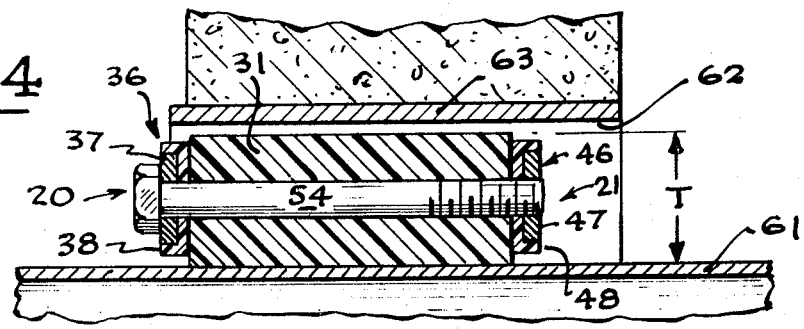
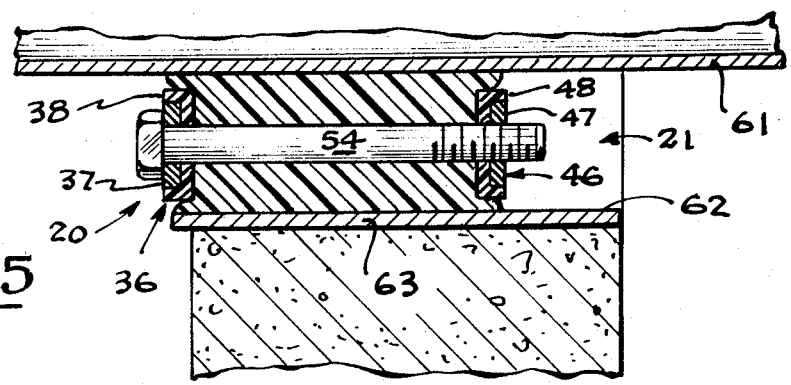
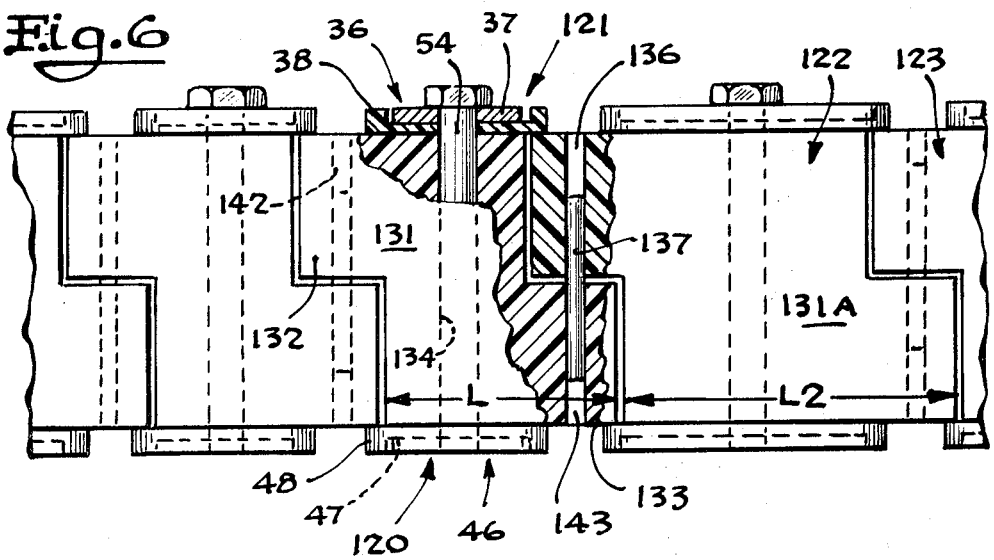

Patented March 14, 1972
3,649,034
3 Sheets-Sheet 3
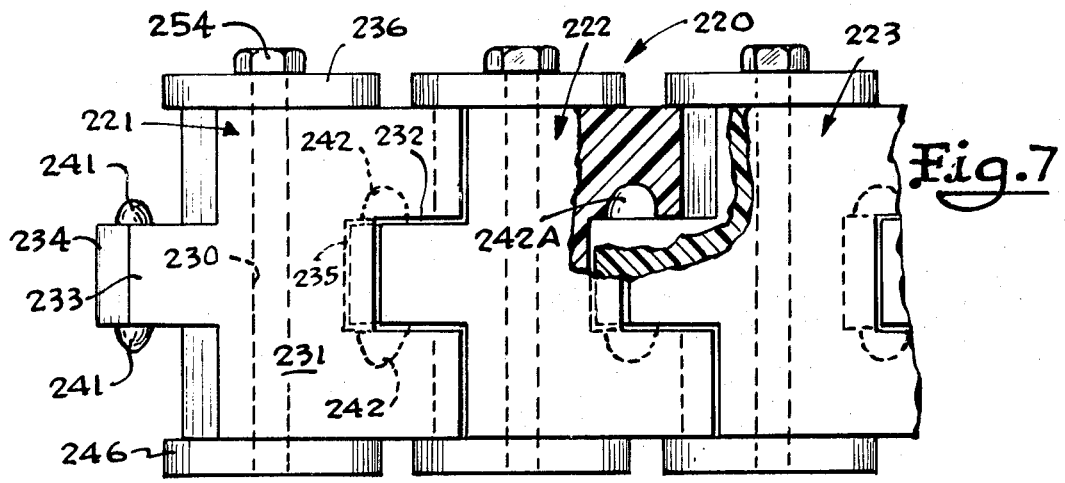
Fig.7
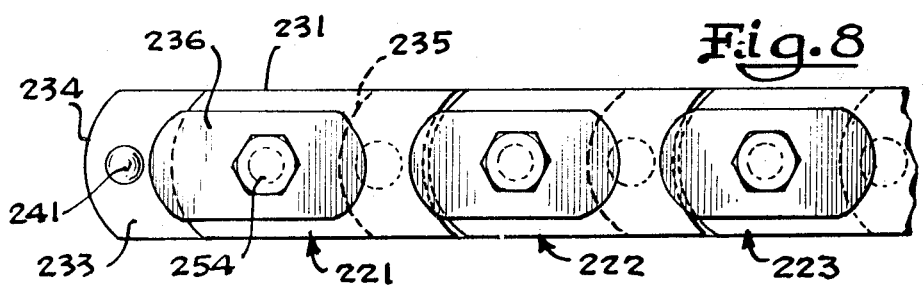
Fig.8
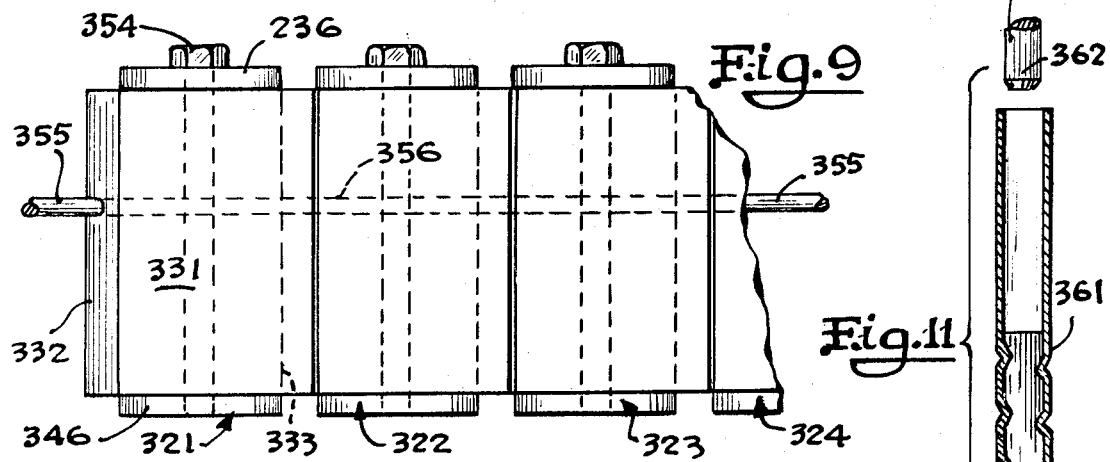
Fig.9
Fig.11
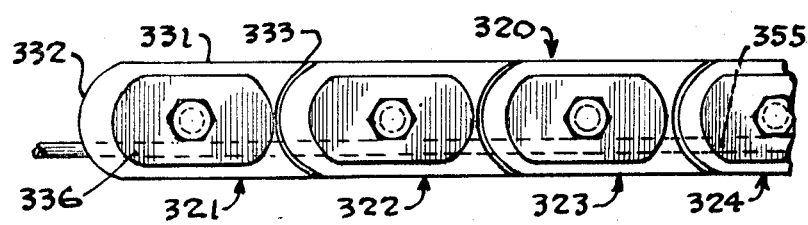
Fig.10
Inventor
Bruce G. Barton
By Kinzer, Dorn and Zickert
Attorneys

MODULAR INTERWALL SEAL UNIT

BACKGROUND OF THE INVENTION

1. Field of Application

There are a variety of different applications in which it is necessary to afford a liquid-tight seal for an electrical conduit, a pipe, or other conduit that extends through a wall or into a larger conduit such as a culvert. Typical examples are underground electrical vaults, pits, tunnels, bridges, pipelines, and the like. In addition to sealing the external surface of the conduit against egress or ingress of water and other liquids, it is frequently necessary to provide for shock absorption. Thus, in an underground electrical vault, electrical conduits should be cushioned against shock, particularly where the vault is located beneath a roadway. The same considerations apply to a pipeline passing through a culvert and in other applications. Sealing may also be necessary for electrical or thermal purposes, and cathodic protection at the seal may be essential.

2. The Prior Art

In the construction of seals for pipes and other conduits projecting through walls in vaults, pits, culverts, and other underground structures, a variety of seal constructions have been used. For example, tapered plugs of relatively resilient material have been employed. Oakum-lead packing ring combinations have been utilized, much like the seals incorporated in waste pipes in plumbing systems These relatively conventional seals have a high tendency toward failure Furthermore, they may be costly and time-consuming in installation and may require a high degree of skill on the part of the workman assembling the seal.

Another form of seal or packing suitable for applications of this kind is shown in Mainprize U.S. Pat. No. 2,964,342 The Mainprize patent employs a cylindrical sealing body of rubber or similar elastomer material with pressure rings embedded in the opposite faces of the rubber cylinder. A series of bolts connect the two pressure rings, being threaded into appropriate connectors mounted on one of the rings, pulling the pressure rings toward each other. The resultant axial compression of the cylindrical rubber body causes that member to expand circumferentially and seal the space between a conduit that runs axially through the body member and an encompassing wall opening.

The Mainprize construction is an improvement over some earlier and more conventional seal arrangements, but in turn offers some difficulties. For example, the Mainprize seal assembly must be placed in the wall before the pipe or other conduit is extended therethrough or else must be moved into position along what may be a rather long length of pipe. Of perhaps greater importance, the construction shown in the Mainprize patent is suitable only for one particular size of conduit projecting through a wall opening of specific size, and cannot accommodate substantial changes either in the outside diameter of the conduit or the inside diameter of the wall opening.

A greatly improved modular seal construction is described in an earlier application of Bruce G. Barton, Ser. No. 660,846, filed Aug. 14, 1967, U.S. Pat. No. 3,528,668, issued Sept. 15, 1970. The annular seal of the Barton patent is made up of a plurality of individual elastomer seal blocks, faced with two segmented pressure plate rings; the bolts that are used to contract the pressure plates also join the blocks in a ring structure. This affords a very versatile and economical seal structure, with a single set of components usable for many different conduit sizes. But it does require removal and subsequent replacement of a part of the pressure rings and at least one bolt in order to lengthen or shorten the ring or to mount the seal ring on a conduit. This may be somewhat difficult, particularly in cramped quarters.

SUMMARY OF THE INVENTION

An annular shock-absorbing seal structure constructed in accordance with the present invention comprises a plurality of modular seal units connected together in continuous end-to-end relation to form a ring. The assembly includes a plurality of seal blocks of resilient compressible elastomer material each having at least one bolt-receiving aperture extending through the block from edge to edge. Releasable connector means are provided, connecting the seal blocks together end-to-end in a continuous ring. In one embodiment, individual pins are used as the connector means; in another, interlocking lugs and sockets molded into the seal blocks serve this purpose. In yet another embodiment, a wire or rope is threaded through the blocks to join them in a ring. First and second sets of pressure plate members are disposed on opposite edges of the seal blocks; each plate member has a length slightly smaller than the length of one of the seal blocks and each plate member has at least one bolt-receiving aperture. A plurality of bolt members are included in the assembly, each extending through the aperture in one pressure plate member from each set, and through a bolt-receiving aperture in one seal block. These bolts mount all of the pressure plate members on the seal blocks, but are not used to join the blocks to each other. Tightening of the bolt members compresses the seal blocks in an axial direction, expanding their length and their radial thickness to complete an annular seal.

The seals of the present invention can be fitted to a variety of different pipe sizes simply by incorporating additional modular seal units in the overall assembly. Because the structural elements of the seals, including the pressure plate members, the seal blocks, the bolts, and the connector members, can all be completely standardized, tooling costs are held to a minimum. Furthermore, labor costs for assembly are quite low, especially since the assembly of a seal unit for a 2½-inch pipe entails exactly the same steps, although repeated an additional number of times, as the assembly of a complete seal for a 1¼-inch pipe. The true modular nature of the seal units thus affords substantial economies both in manufacture and in assembly.

In the field, it is a simple matter to disconnect the releasable connector means and open up the seal unit so that it can be placed around the pipe at a point immediately adjacent the opening in which the seal is required. There is no necessity for positioning of the seal assembly in the wall before the pipe is brought into position and there is no requirement to slide the seal assembly along any substantial length of pipe. Nor is is necessary to remove any of the pressure plates and bolts, a noteworthy factor because the bolts preferably fit quite tightly in the seal blocks. Moreover, if an error has been made in determination of the pipe size, it is a simple matter to add or subtract a modular seal unit at the time of application in the field to avoid delay in completing the seal. The use of releasable connector means separate from the pressure plates and bolts also facilitates the use of seal blocks of varying lengths, a substantial advantage in working with conduits of varying sizes.

BRIEF DESCRIPTION OF THE DRAWINGS

FIG. 4 is a sectional view taken approximately a long line 4—4 in FIG. 3;

FIG. 5 is a sectional view, similar to FIG. 5 but showing the configuration of the parts after the seal has been tightened in place;

FIG. 6 is a plan view, like FIG. 1, of a modification of the present invention using somewhat different pressure plates and a different block configuration;

FIG. 7 is a plan view, like FIG. 1, of another embodiment of the invention, using a different releasable connection between adjacent seal blocks;

FIG. 8 is a partial end elevation view of the seal assembly of FIG. 7;

FIG. 9 is a perspective view of another embodiment of the invention, using a different configuration for the seal blocks and a different connector means for the seal blocks;

FIG. 10 is a plan view of the seal of FIG. 9; and

FIG. 11 is a detail view of a connector element that may be used in the embodiment of FIGS. 8 and 9.

DESCRIPTION OF THE PREFERRED EMBODIMENTS

Figure 1:
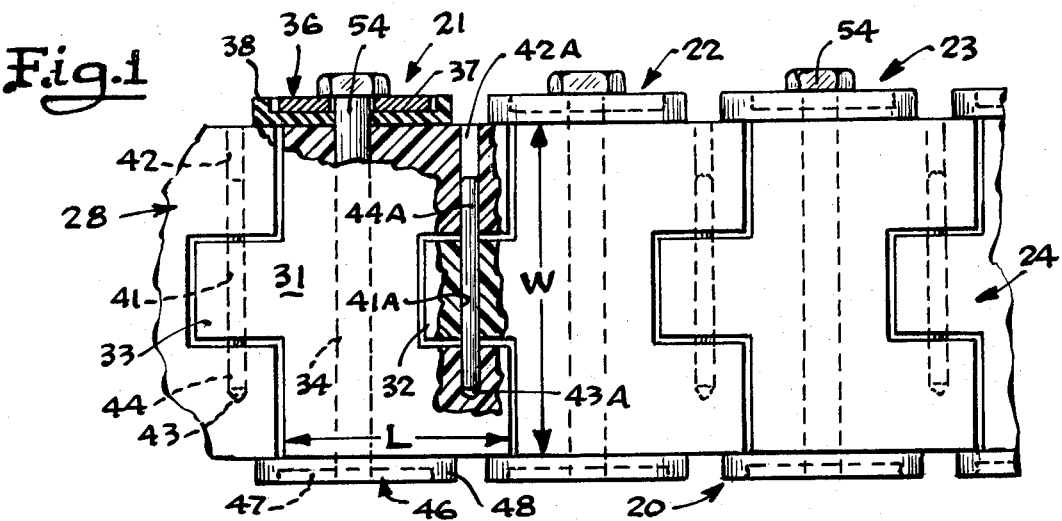
FIG. 1 is a plan view, partially cut away, of a shock absorbing seal assembly, laid flat, constructed in accordance with one embodiment of the present invention.
Figure 2:
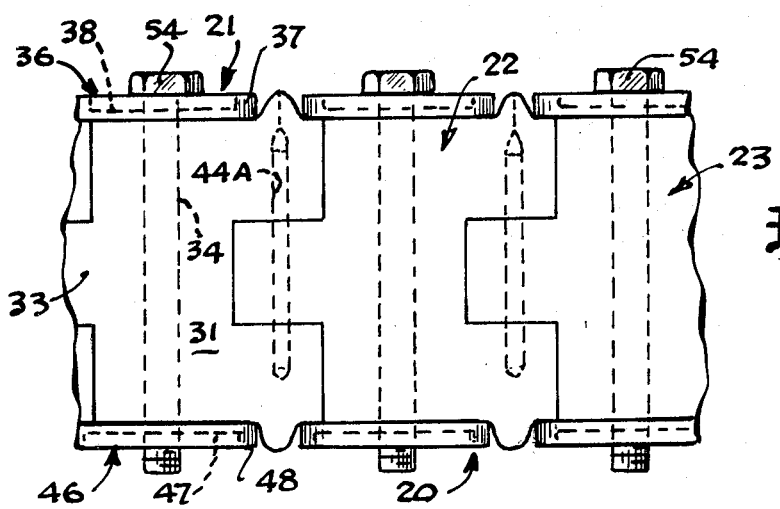
FIG. 2 is a plan view, like FIG. 1, showing the effect of tightening the compression bolts.
Figure 3:
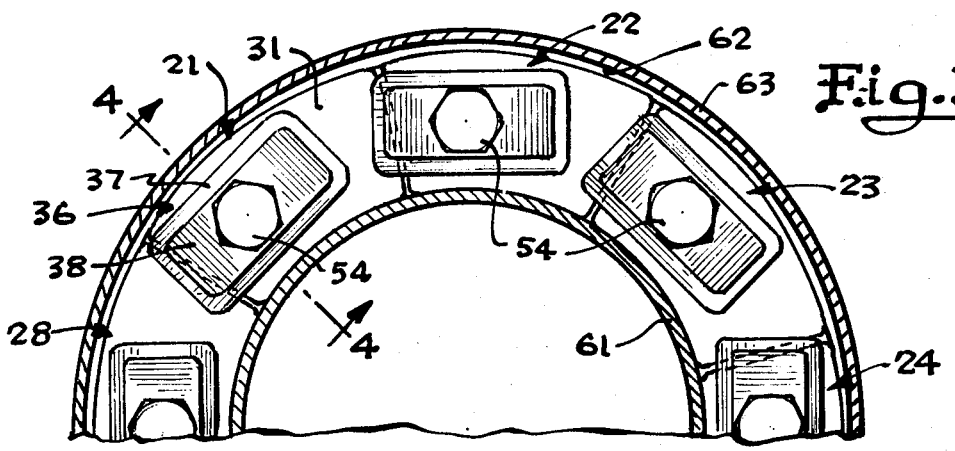
FIG. 3 is an end elevation view, partly in cross section, showing the seal assembly of FIGS. 1 and 2 disposed in operating position for sealing an annular space between a pipe and an encompassing wall surface.

One form of shock-absorbing seal structure 20, constructed in accordance with the invention, is illustrated in FIGS. 1–5. Seal 20 comprises a plurality of individual modular seal units 21, 22, 23, 24, and 28 constructed in accordance with the present invention and inter-linked with each other to constitute an annular shock-absorbing seal, as best shown in FIGS. 1 and 3.

The initial modular seal unit 21 in assembly 20 comprises a seal block 31 of what may be described as orthogonal U-shaped configuration with a slot 32 at one end of the block and a complementary projection 33 at the opposite end of the block (see FIG. 1). Seal block 31 is fabricated from a resilient compressible elastomer material such as rubber, Neoprene, or the like. The seal block is of a given unstressed thickness T (FIG. 4). A bolt-receiving aperture 34 extends through the central portion of seal block 31.

At the top of seal block 31, as seen in FIG. 1, there is a first pressure plate member 36 that is a part of modular seal unit 21. Pressure plate member 36 includes a steel pressure plate 37 disposed within a complementary recess in a pressure plate holder 38 formed of a hard plastic or other electrical insulator material. Holder 38 is slightly shorter than the effective length L of seal block 31. The insulator holder 38 encompasses all but the outer face of the steel pressure plate 37. On the opposite side of modular unit 21, the lower side as viewed in FIG. 1, there is a second pressure plate member 46 that is similar in construction to assembly 36. Thus, pressure plate member 46 includes a steel pressure plate 47 mounted in a recess in an insulator plate holder 48.

Modular seal unit 21 further includes a bolt member 54. The head of bolt 54 engages the steel pressure plate 37. The shank of bolt 54 extends through the aperture 34 in seal block 31, preferably in a tight fit. The other end of bolt 54 is threaded into a tapped opening extending through the steel pressure plate 47.

The remaining modular units 22, 23, 24, 28 are essentially similar in construction to modular unit 21; accordingly, there is no necessity for a detailed description of the additional units. In the construction illustrated for seal structure 20, there are a total of eight seal blocks, all of approximately equal length L, width W and thickness T.

The manner in which the modular seal units 21–28 are joined together to form the complete assembly 20 is clearly apparent from FIGS. 1–3. As seen in FIG. 1, the seal block 31 of modular unit 21 includes an aperture 41 in the projecting portion 33 of the seal block. The seal block of the adjacent modular unit 28 has two corresponding aligned pin-receiving apertures 42 and 43 in the two legs of the U-shaped block. A pin 44, inserted through apertures 42 and 41, and extending into aperture 43, releasably connects the two seal blocks together. A similar pin 44A in clock apertures 41A–43A connects seal block 31 to the seal block of the other adjacent seal unit 22. Thus, there is releasable connector means joining the seal structure 20 in a complete annulus, and the connector means is independent of the pressure plates and the pressure plate bolts.

In the field, one of the connector pins 44, 44A, etc., can be removed and the assembly 20 may then be wrapped around a pipe or other conduit such as the pipe 61 (FIG. 3). The missing pin is then reinserted through the adjacent overlapping ends of the two end units and the seal assembly is ready for installation to seal the external surface of conduit 61 to the internal surface 62 of a wall opening 63 or other opening through which the conduit passes (FIGS. 3 and 4).

When the seal assembly 20 is first placed in position, it may have a relatively loose fit with respect to conduit 61 and surface 62, as shown in FIGS. 3 and 4. To complete the seal, each bolt, such as bolt 54, is tightened. Continued tightening of the bolts forces the two pressure plate members (36 and 46) for each modular seal unit toward each other. This compresses the width of the ring of seal blocks 21–28 between the two sets of pressure plates, in an axial direction relative to the axis of the seal assembly, and causes each seal block to expand in thickness in a radial direction. Expansion may occur both radially inwardly and radially outwardly. Thus, when all of the bolts have been tightened to the condition shown in FIGS. 2 and 5, a complete seal between the external surface of conduit 61 and the internal surface 62 of the wall opening is provided, as shown in FIG. 5. FIG. 2 is a fragmentary plan view showing the effect of tightening of the bolts of the seal assembly and illustrating the confining effect of the pressure plates, forcing most of the rubber to expand in a radial direction to provide the desired tight seal.

In relation to the most frequently encountered pipe sizes in electrical vaults, pits, and other applications for seal assembly 20, it has been found that the overall lengths of the pressure plate members 36, 46 can be somewhat greater than 1 inch. The actual length selected for any pair of pressure plate members should be somewhat smaller than the length L of the seal block with which those members are used. This affords a versatile arrangement, easily able to accommodate relatively small diameter pipe, such as 1¼-inch pipe. At the same time, the modular seal units are large enough, using pressure plate elements of this size, so that a limited number of seal units still completes an assembly accommodating relatively large pipes.

Ordinarily, it is possible to assemble the seal structure 20 in the right length, complete except for one final connection, before fitting the seal structure around the pipe 61. In replacement and repair operations, and in some other applications, however, this may not be feasible; the exact size of the pipe may be unknown. In those instances, a seal structure of approximately correct length can be assembled and taken to the work location, with the workman carrying one or two additional modular seal units. If the seal structure is too short to encompass the entire pipe, an extra seal unit can be added; if it is too long, a seal unit can be removed entirely or can be replaced by a shorter unit, all without requiring the workman to remove any of the pressure bolts or the pressure plate members. This is a substantial advantage, particularly in a limited excavation or other cramped quarters. This replacement operation may be further facilitated by the use of a relatively loose-fitting connector pin (e.g., pins 44, 44A) that can be easily removed and replaced to disconnect and re-connect the seal structure. There is no particular stress on the connector pins, and they need withstand no substantial load at any time; accordingly, extremely simple and inexpensive pins can be used. If the workman drops a few in the course of a day's work, the loss is negligible.

If the length of each pressure plate member (36, 46) is made slightly shorter than the seal block length L, and the pressure plate members are centered on the seal blocks, seal blocks of varying lengths can be intermixed in a single seal structure, as long as the block ends have corresponding interfitting dimensions. An arrangement of this kind is illustrated in FIG. 6, showing a part of a seal structure 120 constructed in accordance with another embodiment of the invention.

FIG. 6 illustrates a shock-absorbing seal structure 120, comprising a further embodiment of the present invention that uses a releasable connector means essentially similar to that of FIGS. 1–5. Assembly 120 comprises a plurality of individual modular seal units 121, 122, 123, etc., constructed in accordance with the present invention and assembled in end-to-end relation to form an annular seal structure.

Seal unit 121 is typical of the modular units employed in the embodiment of FIG. 6. It comprises a seal block 131 formed of rubber, Neoprene, or other elastomer material. In this instance, the seal block is of orthogonal Z-shaped configuration, with a projection 132 at one end and one side of the block and a similar projection 133 at the other end and other side of the block. Each projection fits against a corresponding projection on the two adjacent seal blocks. Projections 132 and 133 on seal block 131 are provided with pin-receiving apertures 142 and 143, respectively. The opposite offset end of the adjacent seal block 135 is provided with a corresponding pin-receiving aperture 136. A pin 137 is slipped into apertures 136 and 143 to afford a releasable connection between seal units 121 and 122. Similar connections are provided between the other seal units in seal structure 120.

Modular unit 121 includes a first pressure plate member 36 of the same construction as described above, including a steel pressure plate 37 and an insulator plate holder 38. Modular unit 121 further comprises a bolt member 54 extending through a central aperture 134 in the seal block 131. Bolt member 54 is threaded into a tapped aperture in a steel pressure plate 47 which, with an insulator plate holder 48, is a part of a second pressure plate member 46. A similar construction is used for the other seal units 122, 123, etc. It should be noted that the modular seal unit 122 includes a seal block 131A having a length L2 substantially larger than the length L of the other seal blocks, such as seal block 131. To assure adequate compression of the seal block 131A throughout its length, the pressure plate members 36A and 46A used for seal block 131A are made longer than members 36 and 46. There is no need for field selection of the pressure plate members to match the seal block length, however, since there is no requirement for disassembly of any seal unit.

FIGS. 7 and 8 illustrate a shock-absorbing seal structure 220 comprising an additional embodiment of the present invention. Assembly 220 comprises a plurality of individual modular seal units 221, 222, 223, etc., constructed in accordance with the present invention and assembled in end-to-end relation to form an annular seal assembly.

Seal unit 221 is typical of the modular units employed in the embodiment of FIGS. 7 and 8. It comprises a seal block 221 formed of rubber, Neoprene, or other elastomer material. Seal block 131 is of generally U-shaped configuration, with a projection 233 at one end of the block and a complementary opening 232 at the other end. The open end 232 of block 231 receives a complemental projection that is a part of the adjacent U-shaped block in seal unit 122. Seal block 131 is provided with a central bolt-receiving aperture 230. Modular unit 121 further includes a first pressure plate member 236. A bolt member 254 extends through an aperture in plate member 236 and through the aperture 230 in the seal block 231. Bolt member 254 is threaded into a tapped aperture in a second pressure plate 246 on the opposite side of block 231.

The projection 233 on seal block 231 has an arcuate end surface 234. Similarly, the central aperture 232 of seal block 231 has an arcuate internal surface 235. The cylindrical surfaces 234 and 235 are complementary to each other. Thus, the seal block of the adjacent seal unit 222 fits closely into the recess 232 in seal block 231; moreover, a relatively good fit is maintained even when the seal blocks are angularly tilted, relative to each other, in completing the ring structure of the seal.

The projecting cylindrical boss 233 on seal block 231 has two connector lugs 241 molded integrally therewith. The two lugs 241 are centered near the free end of the projection 233 and project outwardly at right angles to the seal block projection. In assembling the ring seal structure 220, each of the lugs 241 is engaged in a complemental socket. In seal block 231, the corresponding sockets 242 receive connector lugs formed on the end projection of the seal block for the adjacent seal unit 222. The configuration of the connector sockets is more clearly indicated by the cutaway portion of the seal block of unit 222, showing one of the connector sockets 242A in cross section. Thus, the complete ring is assembled by fitting the blocks together, with the connector lugs on each block extending into the complemental sockets in the leg portions of the adjacent seal block.

Another embodiment of the present invention is illustrated in FIGS. 9-11. The shock absorbing seal structure 320 illustrated in FIGS. 9 and 10 comprises a series of individual modular seal units 321, 322, 324, etc., assembled end-to-end to form an annular seal assembly. Only a portion of the ring seal is shown.

The first modular seal unit 321, which is typical of those incorporated in seal structure 320, comprises a seal block 331 formed of elastomer material such as Neoprene, rubber, or the like. One end of the seal block 331 comprises a projecting cylindrical surface boss 332. The other end of seal block 331 is a complemental cylindrical-surfaced recess 333 that receives the cylindrical boss end of the seal block in the adjacent modular seal unit 322. Seal block 331 has a central aperture 334 through which a pressure bolt 354 extends. The head of bolt 354 engages a first pressure plate member 336 located on one side of seal block 331 The other end of the bolt is threaded into a tapped opening in a second pressure plate member 346. The pressure plate members 336 and 346 are shown as simple metal pressure plates; however, the combination metal and insulator construction described in the previous embodiments may be utilized if desired.

The individual modular seal units 321–324 of the seal structure 320 are joined together by releasable connector means comprising a continuous flexible connector member 355 that is threaded through a series of aligned longitudinal apertures 356 in the seal blocks of the modular seal units. The flexible connector member 355 may be a lightweight rope. Alternatively, the flexible connector member 355 may comprise a stranded wire or even a solid wire.

The strength of flexible connector 355 is not critical, since it is required only to keep the seal blocks together in a generally annular configuration; the stresses applied to the connector member are negligible. If a rope is utilized, the ends of the rope may be tied together to complete the ring; the knot and any slack in the rope are buried in the seal when the seal is tightened in its position of use. On the other hand, a coupling of the kind illustrated in FIG. 11 may be employed. The coupling comprises a sleeve 361 crimped to one end of the flexible connector member 355. The free end 362 of the connector member is inserted in the sleeve, when the required number of seal blocks have been threaded onto the connector member, thus completing the annular seal structure. Only a minimal connection is required, since, as noted above, there is no appreciable stress applied to the connector member.

I claim:

1. An annular shock-absorbing seal structure comprising a plurality of modular seal units connected together in continuous end-to-end relation to form an annular seal structure, comprising:

a plurality of seal blocks of resilient compressible elastomer material of given thickness each having at least one bolt-receiving aperture extending through the block from edge to edge;

releasable connector means connecting said seal blocks together end-to-end in a ring structure;

first and second sets of pressure plate members, disposed on opposite edges of said seal blocks, each plate member having a length slightly smaller than the length of one of said seal blocks and each plate member having at least one bolt-receiving aperture; and a plurality of bolt members, each extending through an aperture in one pressure plate member from one set, through the bolt-receiving aperture in one seal block, and into the bolt-receiving aperture in a pressure plate member from the other set, said bolts mounting all of said pressure plate members on said blocks so that tightening of the bolt members compresses the widths of the seal blocks to expand the seal blocks in length and thickness and complete an annular seal;

said releasable connector means being independent of said pressure plate members and said bolt members, thereby permitting assembly of said seal blocks in a ring structure without displacement of said pressure plate members or said bolt members from said seal blocks.

2. An annular seal structure according to claim 1 in which each said seal block is of generally U-shaped configuration with one end portion projecting away from the bight of the U to fit into the central opening of an adjacent seal block, said releasable connector means joining the seal blocks at the point where said one end portion of each block interfits with the two leg portions of the adjacent seal block.

3. An annular seal structure according to claim 2 in which said releasable connector means comprises a plurality of pins, each inserted into mating pin apertures in said one end portion of a first seal block and in said two leg portions of the adjacent seal block.

4. An annular seal structure according to claim 3, in which the pin aperture in at least one leg portion of each seal block extends completely through the leg portion, to permit insertion of a pin after the seal blocks are fitted together.

5. An annular seal structure according to claim 3, in which said pin is slightly smaller than said apertures to facilitate insertion and removal thereof.

6. An annular seal structure according to claim 2 in which the mating end and leg portions of said seal blocks include complemental lugs and sockets affording said releasable connector means.

7. An annular seal structure according to claim 6 in which two lugs are formed integrally with the projecting end portion of each seal block and fit into complemental sockets in the leg portions of the adjacent seal block.

8. A modular seal unit assembly according to claim 1 in which each seal block presents a projecting cylindrical surface boss at one end of the block and a complementary cylindrical recess at the other end of the block, the projecting cylindrical surface being adapted to fit into the recess in an adjacent seal block.

9. An annular seal structure according to claim 1 in which each seal block is of orthogonal Z-shaped configuration and in which the releasable connector means comprises a pin and socket connection between the projecting legs of each pair of adjacent seal blocks.

10. An annular seal structure according to claim 1 in which said releasable connector means comprises a continuous flexible connector member threaded through aligned longitudinal apertures in all of the seal blocks and having its ends joined together to complete a continuous connector loop.

11. An annular seal structure according to claim 10 in which said flexible connector member is a lightweight rope.

12. An annular seal structure according to claim 10 in which said flexible connector member is a metal wire.

13. An annular seal structure according to claim 10 in which the ends of said flexible connector member are joined by a sleeve crimped to one end of the flexible connector member and affording a socket for receiving the other end thereof.

14. An annular seal structure according to claim 1 in which each pressure plate member comprises a metal pressure plate fitted into a pressure plate holder of electrical insulator material that encompasses all but one surface of the metal pressure plate.

* * * * *